United States Patent
Rao

(10) Patent No.: US 7,184,061 B2
(45) Date of Patent: Feb. 27, 2007

(54) SYSTEM AND METHOD FOR FRAMING AN IMAGE

(75) Inventor: Sumita Rao, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 329 days.

(21) Appl. No.: 10/701,196

(22) Filed: Nov. 4, 2003

(65) Prior Publication Data

US 2005/0093888 A1 May 5, 2005

(51) Int. Cl.
*G06T 15/00* (2006.01)
(52) U.S. Cl. ............... 345/629; 345/634; 382/162; 382/307
(58) Field of Classification Search ........... 345/629, 345/634; 382/162, 307
See application file for complete search history.

(56) References Cited

U.S. PATENT DOCUMENTS

| 5,870,771 | A | 2/1999 | Oberg |
| 2003/0021468 | A1 | 1/2003 | Jia et al. |
| 2004/0119726 | A1* | 6/2004 | Li ........................ 345/629 |

* cited by examiner

*Primary Examiner*—Phu K. Nguyen

(57) ABSTRACT

A method of applying a frame to an image is provided, with the method operating on an image processor. The framing method uses a compact and flexible frame description for building a frame in a particular style. The frame description includes one or more graphical frame assets that are indicative of a portion of the frame. A frame rule provides instruction to the image processor on how to process and place the frame asset(s) into the frame, and how to apply the frame to the image. The framed image may then be published for local viewing, remote viewing, printing, or storing.

36 Claims, 6 Drawing Sheets

SYSTEM AND METHOD FOR FRAMING AN IMAGE

BACKGROUND

The field of the present invention is automatic frame generation using a processor. In particular, the present invention relates to adding a frame to a graphic image.

Many types of computing devices acquire, store, or display graphical images. These images may be in the form of pictures, clip art, stock photos, or other graphical representations. The pictures may be in color, in black and white, or in a gray scale, and may have various resolutions, bit depths, or other characteristics. The computing devices acquire these images either by downloading the images from another source, such as from a server, or by taking a digital image using a digital camera module, such as a CCD device. For example, a wireless phone now commonly has a camera device for taking a digital picture, and displaying that image on the mobile phone's LCD display screen. The mobile phone may also wirelessly communicate the image to other mobile phones or to other computing devices for viewing, storing, or printing. Alternatively, images may be acquired through physical connection, such as to the Internet or with a direct connection to another computer system. Other types of computing devices may include personal data assistance (PDA), laptops, notebook computers, tablet computers and Internet appliances. Other examples include wireless devices such as mobile phones, mobile data assistants, and telemetric devices. All these devices are generally capable of displaying a single image, and many of these devices may be capable of acquiring or displaying a sequence of images, such as frames of a movie or an animation. For example, many digital camera systems are capable of taking both still images and generating a movie file comprising a sequence of image frames. The images and the movies maybe for local presentation or may be transferred to a remote device for storage or viewing.

When viewing these images, either as individual images or as a movie, it is often desirable to add a frame for the image. A frame is a visually distinctive graphical element viewed along with the image. Frames provide an aesthetically pleasing aspect to the image, and allow an individual to add a bit of personality and creativity to an image. A frame may also assist the user in focusing a message relating to the image, or may be useful to distinguish the image from other images or from a background. Also, frames are decorative, and add fun and whimsy to the hobby of taking and publishing images and movies. The framed images may be viewed locally, for example, by viewing the framed image on a local display. The framed image may also be published to other computing and display devices such as other computers, other wireless phones, or personal data assistants. Also, the framed images may be stored locally, in magnetic media, or on remote servers for later access.

Users often desire the ability to select a specific frame for a particular image. Many users further desire the ability to select among many available frame styles when choosing a frame. Accordingly, it is desirable that computing devices hold or have access to many frame styles to satisfy the users. These frame styles may be provided in the local device, or the device may provide a mechanism for downloading or adding additional frame styles. For example, a wireless phone may have several frame styles in local read-only memory, and further may allow for selection and downloading of additional frame styles from a remote server.

Typically, each frame style is stored as a separate graphical image file in the local device. Each graphic file typically consumes 10 k to 30 k of memory space. Further, a different graphic file is usually needed for each supported image size or resolution. Different sizes are used to allow the user to select more particularly how the image will fit with the frame. For example, the user may desire that the frame be relatively narrow for one image, and may desire that the same style frame be relatively wide for another image. Also, different resolutions may need to be supported, for example, for viewing an image on a small local screen, for viewing on a full size computer screen, for display on PDA's, for publishing to a website, and for printing. Thus, it may be desirable to have other resolutions available for each frame style. In this way, when a user selects a single frame style, and desires that frame style to be available in five sizes or resolutions, that single frame style may consume 50 k to 150 k of memory. If a user has only ten frame styles, each available in five sizes or resolutions, then storing the frame styles could consume 500 k to 1500 k of memory. Since memory is a scarce resource on many devices, such as in mobile phones and PDA's, users are limited in the number of frame styles that may be locally stored. Further, transferring these frame styles to the device consumes transmission bandwidth, and often carriers a communication cost. Particularly for remote devices communicating wirelessly, it is desirable to minimize transmission bandwidth.

In use, a user selects a particular type of frame style and selects a resolution for publication. The local device opens the selected frame file and inserts the image into a transparent area of the frame graphic. The combined frame and image are then ready for publication. However, since the frame file is a separate image, resizing the frame also causes a corresponding resize in the transparency area. Accordingly, since the image size and resolution is not easily change, it is not convenient to resize a frame to meet the particular desires of a user. Since a single frame style cannot be easily resized, several sizes or resolutions of a single frame are often stored, thereby consuming substantial memory. Alternatively, a processor could implement an algorithmic solution to the resizing issue, but such an algorithm would use valuable processor power, and may use substantial memory for its operation.

Unfortunately, the known way of adding a frame to an image requires storing relatively large frame files for each size and resolution desired. Further, the user is limited to specific resolutions that the frame may be resized to. With the memory, bandwidth, and resizing constraints of known framing techniques, users are limited in their use and selection of frame styles.

In another example of adding a frame to an image, it is known in modern computer applications to add frames to images. For example, graphics program may provide frame portions that may be manually selected, sized, and manipulated for placement around an image. After all the frame elements have been placed around the image, a user selects all the frame portions and saves the combination as a group. This grouped frame/image may then be viewed, published, or otherwise transmitted. However, the process is cumbersome and time consuming and is not practically practiced on many devices such as mobile phones, for example, because typical mobile phones have limited user input controls and capability.

Therefore, to overcome the deficiencies outlined above, there exists a need to provide a system and method for generating a framed image.

SUMMARY

Briefly, the present invention provides a method of applying a frame to an image, with the method operating on an image processor. The framing method uses a compact and flexible frame description for building a frame in a particular style. The frame description includes one or more graphical frame assets that are indicative of a portion of the frame. A frame rule provides instruction to the image processor on how to process and place the frame asset(s) into the frame, and how to apply the frame to the image. The framed image may then be published for local viewing, remote viewing, printing, or storing.

In a preferred example of the framing system, the image processor is in a wireless mobile phone. A user of the mobile phone acquires an image to be framed, for example, by downloading the image from a server or by generating the image using a digital camera module. The user is then enabled to select one of several available frame styles, with each frame style having an associated set of frame assets and a frame rule. In one example, the set of frame assets may include a corner asset and an edge asset. The corner asset is processed into corner blocks that are placed at the corner of the image, and the edge asset is processed into edge tiles that fill the spaces between the corners blocks. In this way a continuous frame is constructed for the image.

Advantageously, the disclosed framing system and method allows for the efficient downloading and storage of frame descriptions. In this way, a user of a computing device, especially a device with scarce memory availability, is able download and store many frame styles. Also, the frame description is able to accommodate many resolutions and sizes, and therefore supports multiple frame sizes and is efficiently used for different publishing purposes. The framing system and method provides for efficient selection and application of frames, and is easily adaptable to meet the requirements of particular users. For example, the frame rule may be adjusted to enable sophisticated user control, or may be kept more basic for simplicity and easy operation. These and other advantages will become apparent by review of the figures and detail descriptions that follow.

DETAILED DESCRIPTION

Figure 1:
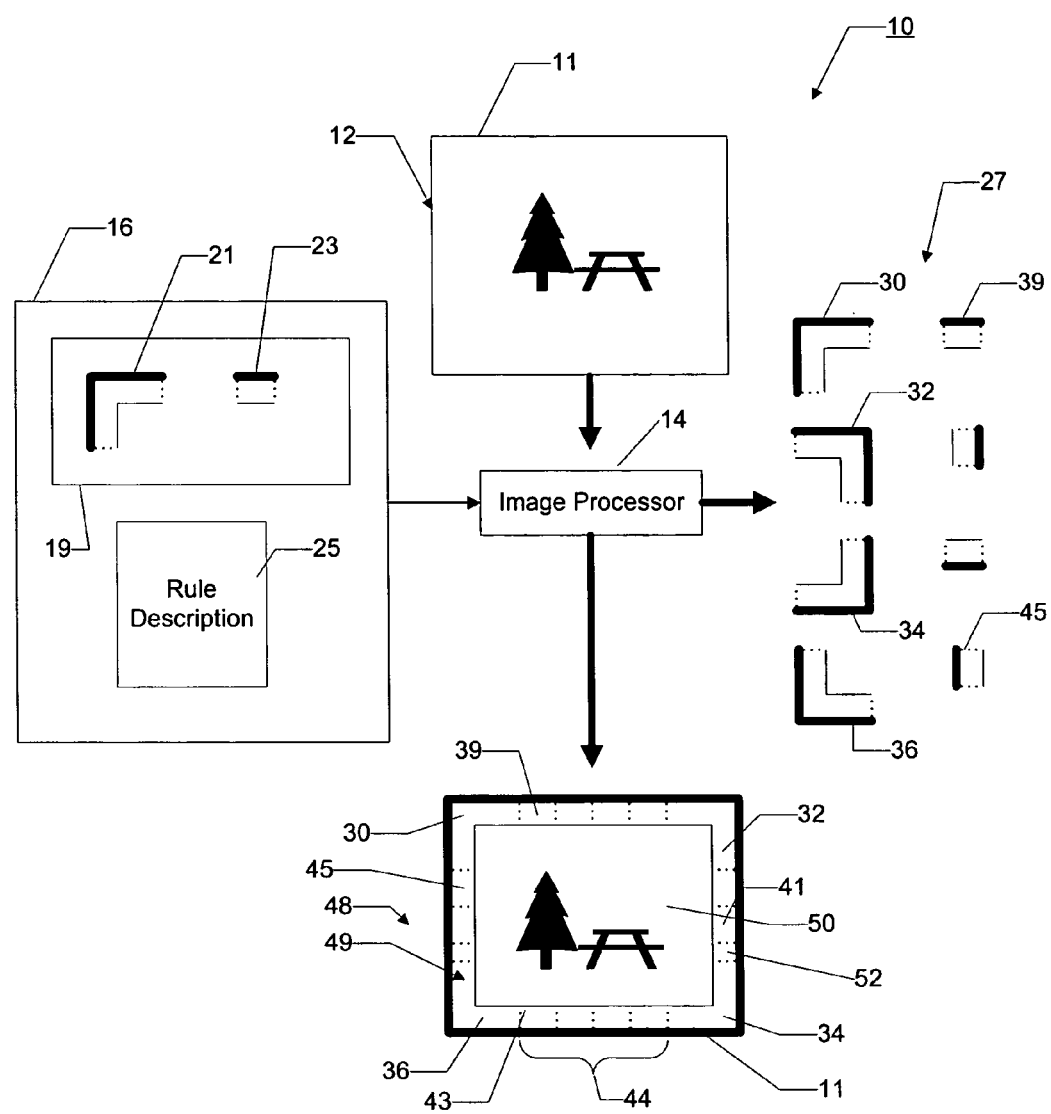
FIG. 1 is a block diagram of a system and method of framing in accordance with the present invention.

Referring now to FIG. 1, a system and method for framing an image is shown. The framing system 10 has a process operating on an image processor 14. The image processor may be, for example, a processor in a mobile phone, or a processor operating in a computing device. It will be appreciated that the image processor 14 may be a microprocessor, a multiprocessor construction, a distributed processing arrangement, a gate array, a PLD, or other known processing arrangement. Image processor 14 has associated memory functions, user input functions, and user display functions, which are well known and will not be addressed in detail.

Generally the framing system 10 enables the image processor 14 to efficiently add a frame, such as frame 49 to an image 12. A user is able to select among available frame styles, and the image processor generates a framed image according to the selected frame style. The framed image is an aesthetically pleasing representation of the image, which may then be published to other computing devices or mobile phones, printed, or otherwise distributed. Further, the frame style is easily resized, with the frame and the image retaining an appropriate aspect ratio during the resizing process. Advantageously, the description of each frame style may be efficiently stored or transmitted, thereby reducing memory and bandwidth requirements. In this way, a device, such as a mobile phone, may efficiently store several frame styles for selection by a user.

In framing system 10, a user selects an image 12 to be framed. The image 12 may be, for example, a picture taken with a local digital camera module, or an image that has been downloaded into the user's computing device. In this regard, a mobile phone user may download an image wirelessly into the mobile phone device, display the image on the phone display, and then direct that the downloaded image is to be framed. The boundary 11 of the image may or may not be indicated, for example, by a line or white space.

The user manipulates controls on the computing device to select a particular frame style from the available frame styles. However, it will be appreciated that the image processor may have a default frame style that is applied unless the user selects a different frame style. Each frame style has an associated frame description to enable the image processor to construct or build a frame. A frame description 16 includes one or more frame assets 19 and a frame rule 25. For example, frame assets 19 may include a corner asset 21 that is a graphical representation of a corner segment of the selected frame style. The frame assets may also include an edge asset 23 that is a graphical representation of a side segment for the selected frame style. It will be appreciated that the frame assets may be stored in standardized graphic formats, such as the portable network graphic standard (.png) or the bitmap graphic standard (.bmp), or may be stored in a proprietary format. For ease of interoperability, it is preferred that the frame assets be stored in a widely available standard image format. It will also be appreciated that the frame assets may be stored in more than one image format, and the image processor configured to retrieve and process files in the available formats.

Although the frame assets 19 include a corner asset 21 and an edge asset 23, a more complex frame style may use more assets, and a simpler frame may use only one frame asset. In an example of a more complex frame, a special frame asset may be used to add particular detail to one corner, or an accent asset may be used to add an accent within an image. It will also be appreciated that a frame may be continuous, as shown by frame 49, or may be composed of discreetly placed frame blocks. For example, a frame may include only corner assets with no frame blocks placed on the edge for filling between the corners. Also, a frame may include assets positioned on the image away from the perimeter, to add accent within the image. Such an accent could include an arrow, a message, a symbol, or even another graphical image.

The frame rule 25 provides a set of instruction to the image processor for using the assets 19 to build or construct a frame. For example, frame rule 25 may instruct the image processor 14 to generate frame blocks 27 which may then be used to construct or build a frame. In the example shown in FIG. 1, the frame rule 25 instructs the image processor to use corner asset 21 to generate a frame block 30. The frame rule also includes instructions to rotate the corner block 21 90 degrees and generate frame block 32, rotate corner asset 21 180 degrees and generate frame block 34, and rotate corner block 21 and generate frame block 36. In this way, frame blocks 30, 32, 34, and 36 may be positioned at their respective corners of image 12. Frame rule 25 also includes instructions for the image processor to use edge asset 23 to generate frame block 39, to rotate the edge asset 23 90 degrees and generate frame block 41, rotate the edge block 23 180 degrees and generate frame block 43, and rotate the edge block 23 270 degrees and generate frame block 45. Frame blocks 39, 41, 43, and 45 may then be duplicated and tiled to fill the space between the corner pieces, thereby completing a continuous frame construction. For example, the area 44 along the bottom edge, which is between corner 36 and corner 34, may be filled with four of the bottom edge blocks 43. In this way, four bottom blocks 43 are sufficient to fill the space between the corners. The space between the corners may require the use of a filler segment, such as filler segment 52. The space between corner 32 and corner 34 is filled with two edge tiles 41, and a filler tile 52, which is a shortened version of tile 41. It will be appreciated that various algorithms and methods may be used for filling the frame area between the corner pieces.

The frame rule may also include additional instructions for the image processor on placing frame blocks 27 and additional control information. For example, the frame rule 25 may instruct the image processor to place the frame blocks 27 so that the outer edge of the frame is positioned at the image border 11. In this way, the frame blocks are positioned on the image, thereby deforming the perimeter portion of the image. Alternatively, the frame rule 25 could instruct the image processor to place the frame blocks so that the inner edge of the frame is positioned at the image border 11. In this way the frame would extend around the image, and the full image area would be displayed. In the case where the frame blocks are positioned on the image, the displayed image area 50 is reduced from the image area of the image as original displayed.

The frame rule may also accept user input for dynamically adjusting the frame 49. For example, the user may be enabled to use a control, such as a toggle switch, to adjust the width of the frame 49. In this way, the use may change the relative visual impact of the frame, while not obscuring the observable image 50, and without leaving gaps between the frame and the image. The user is allowed to resize the frame independent from the size and resolution of the image. Other user controls may be used, such as keypad entry or touch sensitive screen. It will be understood that the dynamic adjustment to the frame width may be made at alternative steps of the framing process.

The image processor places or positions the frame blocks 27 according to the frame rule, and generates a framed image 48. Once the framed image has been generated, the image processor may either delete or retain the original image according to default instructions, or instructions provided in the frame rule 25. The framed image may then be published for further use and presentation. For example, the framed image may be displayed locally to the user, may be printed, or may be transmitted to another device for storage or display. If the user has framed an image on a mobile phone, the user may transmit the framed image to another mobile phone, or to another computing device for display or storage. It will be appreciated that the mobile phone could be any wireless subscriber device capable of communicating on a wireless network. For example, a portable data system (PDA) may be configured to receive wireless communications, such as graphics files, and may present those graphics files to the PDA user.

Advantageously, the frame 49 may be easily resized, with the frame 49 and the image portion 50 retaining an appropriate aspect ratio irrespective of the final size and needed resolution. Also, the frame description 16 comprises a set of frame assets, with each frame asset represented by a small and efficient graphic file. These frame assets and rules provide sufficient flexibility so that a single frame description may be used for many resolutions and aspect ratios. The frame description 16 includes a frame rule 25 that also is efficiently stored. In this way, the entire frame description takes a relatively small amount of memory as compared to previous methods of storing frames, and easily accommodates resizing and different resolutions.

Figure 2:
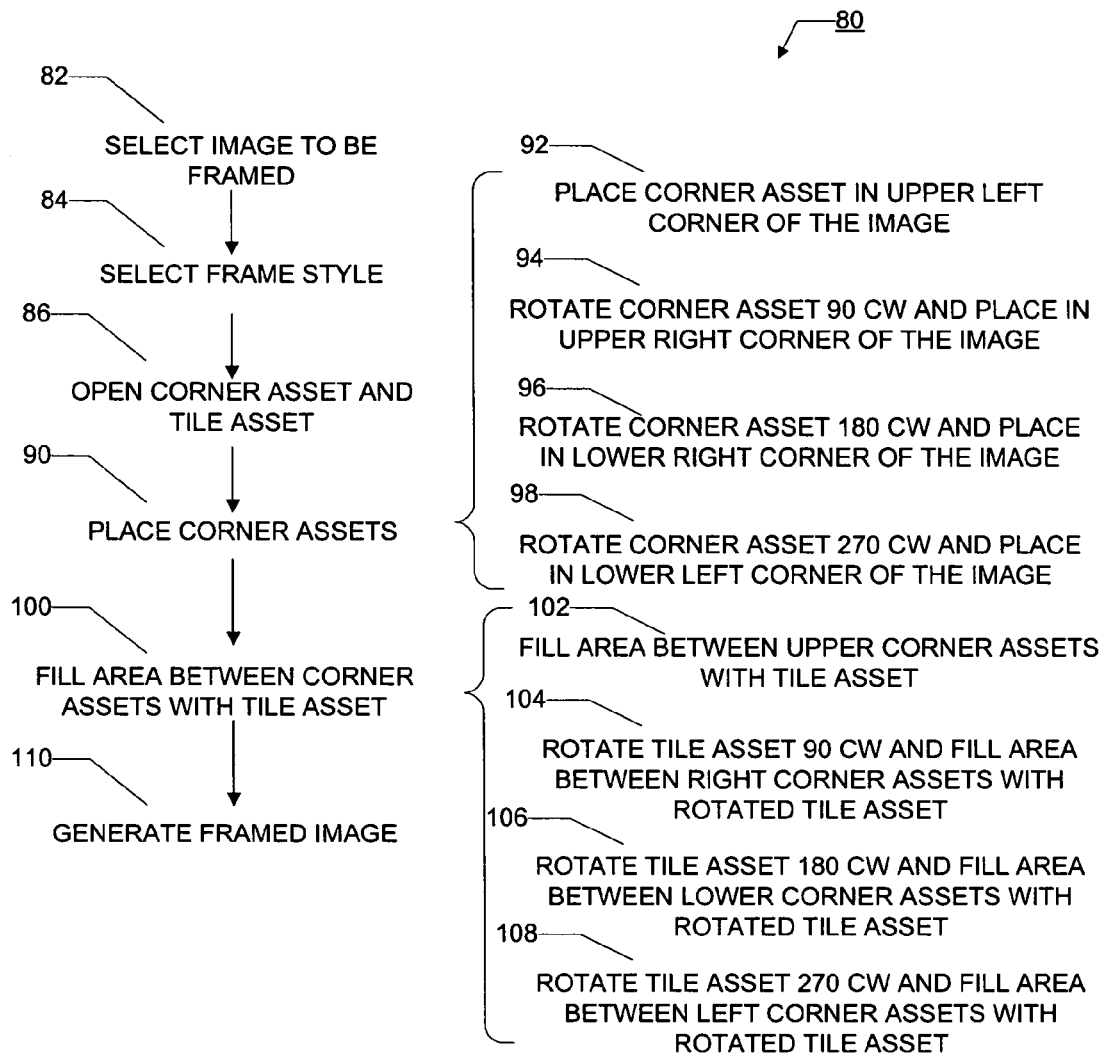
FIG. 2 is a flowchart of a method of framing in accordance with the present invention.

Referring now to FIG. 2, a method for framing 80 is shown. Method 80 may be operated on an image processor, such as an image processor operating in a computing device or a wireless mobile phone. The method 80 includes selecting an image to be framed 82. The image may be, for example, a picture taken by a local digital camera module, or may be an image downloaded into the local computing device. The image may also be a sequence of images, or frames, that form an animation or movie. A user then selects a frame style 84. Due to the efficient storage of frame descriptions, the user may be able to select among many available frame styles. Also, it will be appreciated that a device may have a default frame style that could be used without selection by the user. In this way, the computing device would apply the default frame unless the user selected an optional frame style. The user may also be allowed to dynamically adjust the selected frame style, for example, by adjusting the relative width or size of the frame.

Once the user has selected a frame style 84, the frame style is associated with a frame description. The frame description includes the identification of one or more frame assets, such as a corner asset and edge tile asset. These frame assets may be stored, for example, in a standard graphical file format. The image processor then proceeds to open the image file associated with the corner asset and tile asset 86. The image processor processes and places the corner assets 90 according to a frame rule. The frame rule may be associated with the frame description, or may be a default frame rule associated with the computing device. Typically, a device will apply the default frame rule unless a different frame rule is associated with the particular frame style selected by the user.

In one example of processing and placing the corner assets, the frame rule instructs the image processor to generate a frame block in the same orientation as the corner asset and place that frame block in the upper left hand corner of the image 92. The frame rule then instructs the image processor to generate another frame block by rotating the corner asset 90 clockwise and then placing that frame block in the upper right hand corner of the image. Another frame block is generated by rotating the corner asset 180 degrees clockwise and placing that corner frame block in the lower right hand corner of the image. Finally, a frame block is generated by rotating the corner asset 270 degrees clockwise and placing that frame block in the lower left hand corner of the image. In this way, frame corner segments are applied to all four corners of the image. It will be understood that other algorithms and specific processes may be used for processing and placing the corner asset. Some frames may include only corners, with no frame segments placed between the corner segments. However, if the frame rule defines a frame that is continuous, then the spaces between the corners will be filled with edge frame portions.

If the area between the corners is to be filled, then an edge asset needs to be acquired. In one example, the image processor may extract a corner leg or a portion of a corner leg and use the extracted portion as an edge asset. The edge asset is then used to fill the area between corners 100. In another example, an edge asset is provided in the frame description along with the frame rule. In this example, the frame rule may instruct the image processor to duplicate the provided corner asset a sufficient number of times and place the duplicated frame blocks between the upper corner blocks to complete the frame portion along the upper edge of the image. The frame rule may also instruct the image processor to generate frame blocks by rotating the edge asset 90 degrees clockwise and duplicating the edge asset a sufficient number of times to fill the area between the right corner blocks, thus applying a frame portion along the right edge of the image 104. The frame rule may also instruct the image processor to generate frame blocks by rotating the edge asset 180 degrees clockwise and duplicating the edge asset a sufficient number of times to fill the area between the lower corner blocks, thereby placing a frame portion along the lower edge of the image 106. Finally, the frame rule may instruct the image processor to generate frame blocks by rotating the edge asset 270 degrees clockwise and duplicating the edge asset a sufficient number of times to fill the area between the left corner blocks, thereby providing a frame portion along the left edge of the image.

For a simple frame, a single frame asset may be used to generate the entire frame. In such a simple frame, the frame would instruct the image processor to process and duplicate the frame asset into frame blocks, and place those frame blocks on or around an image. A single asset may be used, for example, with simple frame designs that are highly symmetrical. Also, frame rules may also indicate an axis of symmetry for an asset or for a frame portion. For example, a frame rule could provide for building an entire edge portion of a frame, and then provide a rule to mirror or reflect that edge portion around an X or Y axis to the opposite side of the image. In this way, the frame rule can reduce memory needs and improve processor efficiency by taking advantage of symmetry in a frame style.

The image processor then generates a framed image, and responsive to instructions in the frame rule, may delete the original image, or may retain the original image in local or remote memory. The framed image may then be published. The framed image may be displayed locally, or may be communicated or transmitted to another computing device for display or storage. For example, if the framed image is generated on a wireless mobile phone, the wireless mobile phone may transmit the framed image to another wireless mobile phone, or to another computing device for display. Since the frame and the image are included in a single graphical file, the framed image may be easily resized and displayed with an appropriate aspect ratio. Also, the frame rule may be arranged to flexibly accommodate the different resolutions for the different publishing mediums.

Figure 3:
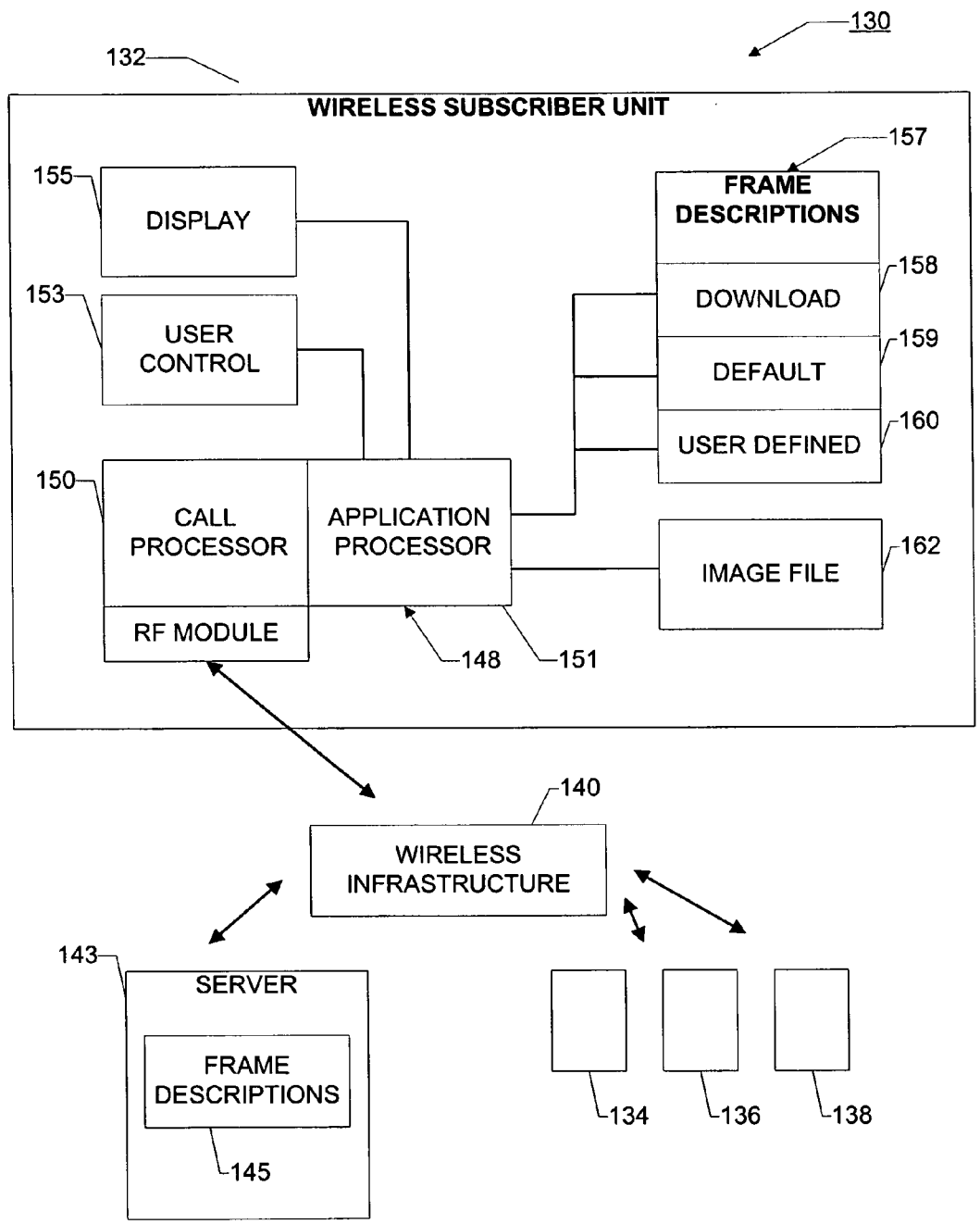
FIG. 3 is a block diagram of a wireless framing system in accordance with the present invention.

Referring now to FIG. 3, a wireless framing system 130 is shown. Wireless framing system 130 includes a wireless subscriber unit 132. For example, the wireless subscriber unit 132 may be a mobile phone, or may be a PDA constructed to communicate wirelessly. It will be understood that other computing devices may be used. The wireless subscriber unit 132 communicates with wireless infrastructure 140. Wireless infrastructure is well known and will not be described in detail, but includes antennas, base stations, and other support functions. The wireless infrastructure 140 facilitates communication between wireless subscriber unit 132 and other wireless subscriber units such as wireless subscriber units 134, 136, and 138. The wireless infrastructure 140 also enables the wireless subscriber unit 132 to access content providers. Content providers may store their content on servers, such as server 143. In one example, server 143 may include frame descriptions 145. These frame descriptions would each be associated with a frame style for framing an image. In use, the user of wireless subscriber unit 132 would access server 143 through the wireless infrastructure 140. The user may then select one or more frame descriptions 145 to download into the wireless subscriber unit. Those downloaded frame descriptions would then be stored in the wireless subscriber unit 132.

Wireless subscriber unit 132 includes a processor 148. Processor 148 may be arranged as a single processor or may be part of a multi processor arrangement. The processor 148 generally includes an application processor section 151 for processing user applications, and a call processor section 150 for handling wireless communication functions, such as initiating and answering wireless calls. The call processor 150 also interacts with an RF (radio frequency) module that provides, through an antenna, a communication path to the wireless infrastructure 140. The user of the wireless subscriber unit 132 interacts with the wireless subscriber unit 132 through a set of user controls 153. The user controls 153 may include for example, a keypad, buttons, knobs, and voice control. The wireless subscriber unit also has a display 155 for displaying text, graphics, and other information to a user. In particular, the display 155 may be a black and white or color LCD display capable of displaying graphical information such as picture or image data. The wireless subscriber unit may also include a camera function so the wireless subscriber unit may acquire a digital picture. After acquiring the picture, the digital picture may be displayed on display 155. It will also be appreciated that wireless subscriber unit may download images and pictures from other wireless subscriber units or from a server, and those images may be stored or displayed on wireless subscriber unit 132.

The wireless subscriber unit also contains one or more frame descriptions stored in a frame description memory 157. The frame descriptions 157 may include frame descriptions downloaded 158 from server 143, and may include frame description that the user defines160. The user defined frame descriptions may be created on the local wireless subscriber unit 132, or may be created on another computing device and transferred in to the wireless subscriber unit. The wireless subscriber unit 132 may also have default frame descriptions 159 that the device will use unless the user selects another frame description. The wireless subscriber unit 132 also includes an image file 162 which may include image or picture information. For example, the image file 162 may include pictures or images taken by a local digital camera or images and pictures downloaded from a server through the wireless infrastructure 140.

The frame descriptions 145 and the frame descriptions 157 include one or more frame assets in the form of graphic files. The frame descriptions also include frame rules for processing and placing the frame assets. It will be appreciated that the frame description may include the frame assets and frame rule in multiple files or in a single file. Further, it will be appreciated that the frame rule and frame assets may be stored in different locations. For example, a frame rule may be stored and executed in the local wireless subscriber unit 132, with the frame rule providing the application processor 151 with instructions to obtain the frame assets from another location, such as from the server 143. In this way, the local wireless subscriber unit needs only to store a very small and efficient rule file, with specific graphic assets stored on a server that has less memory constraints.

Figure 4:
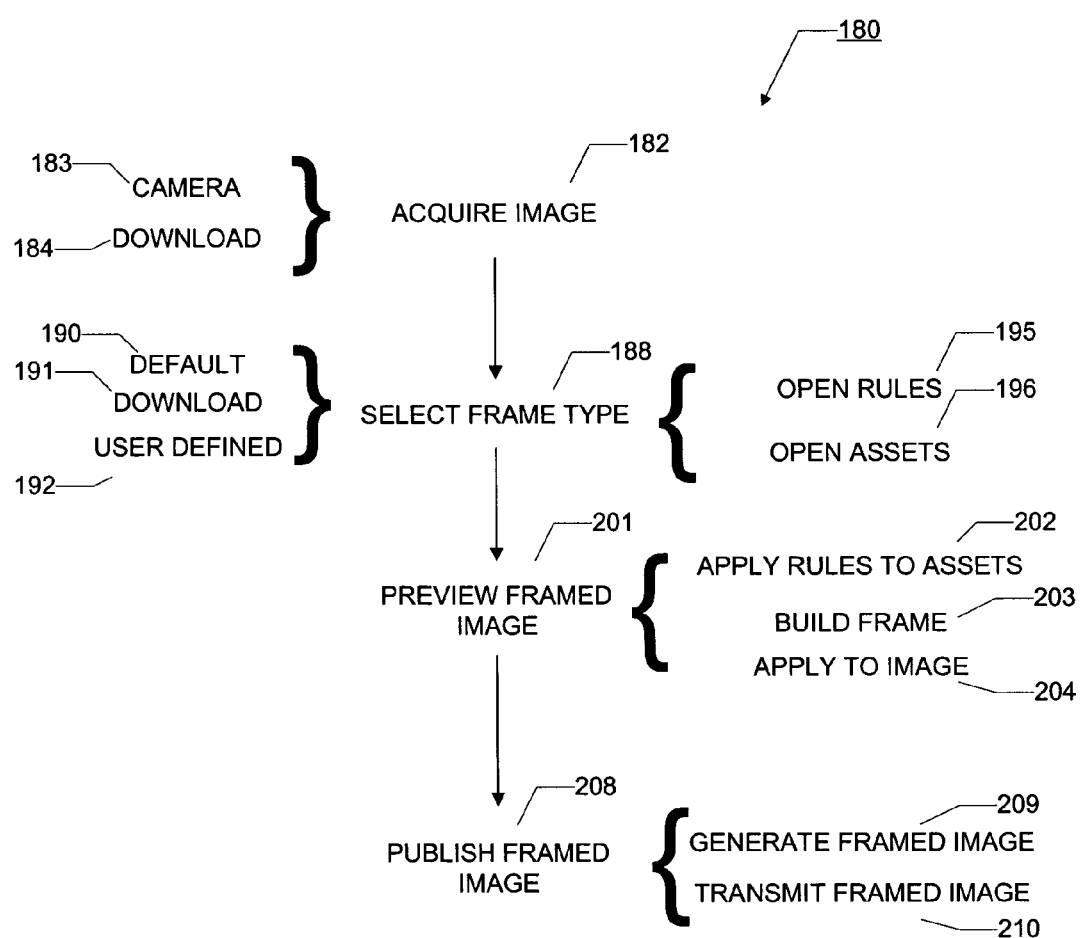
FIG. 4 is a flowchart of a method of framing in accordance with the present invention.

Referring now to FIG. 4, a method for framing 180 is shown. Method 180 first shows the user acquiring an image 182. The image may be acquired, for example, from a local digital camera 183 module, or may be downloaded 184 from a remote location. The user then selects a frame style 188. The frame style may be for example, a default 190 frame style, a frame style which has been downloaded from a remote server 192, or may be a style defined by the user 192. It will be appreciated that the user defined frame types may be predefined either locally or using another device, or may be interactively defined at the time the frame is being applied to the image. In this way, a user may provide specific instructions to the image processor for processing and placing frame blocks around or on the image. Once the frame style has been selected, rules 195 are accessed either locally or remotely, and assets 196 are accessed either remotely or locally.

After the user has selected the frame type 188, the user would then be presented with a preview of the framed image 201. To provide this preview of a framed image, the local image processor would apply the frame rules to the frame assets 202, process and position frame blocks to build the frame 203, and apply the frame to the image 204. Once the user has approved the frame, the user is able to publish the framed image 208. For example, the user could generate and display the framed image locally 209, to transmit the framed image to another computing device for viewing, printing, or storage. Advantageously, the computing device receiving the image may easily resize the image and retain the appropriate aspect ratios, and the framed image may be generated to accommodate specific resolution needs.

Figure 5:
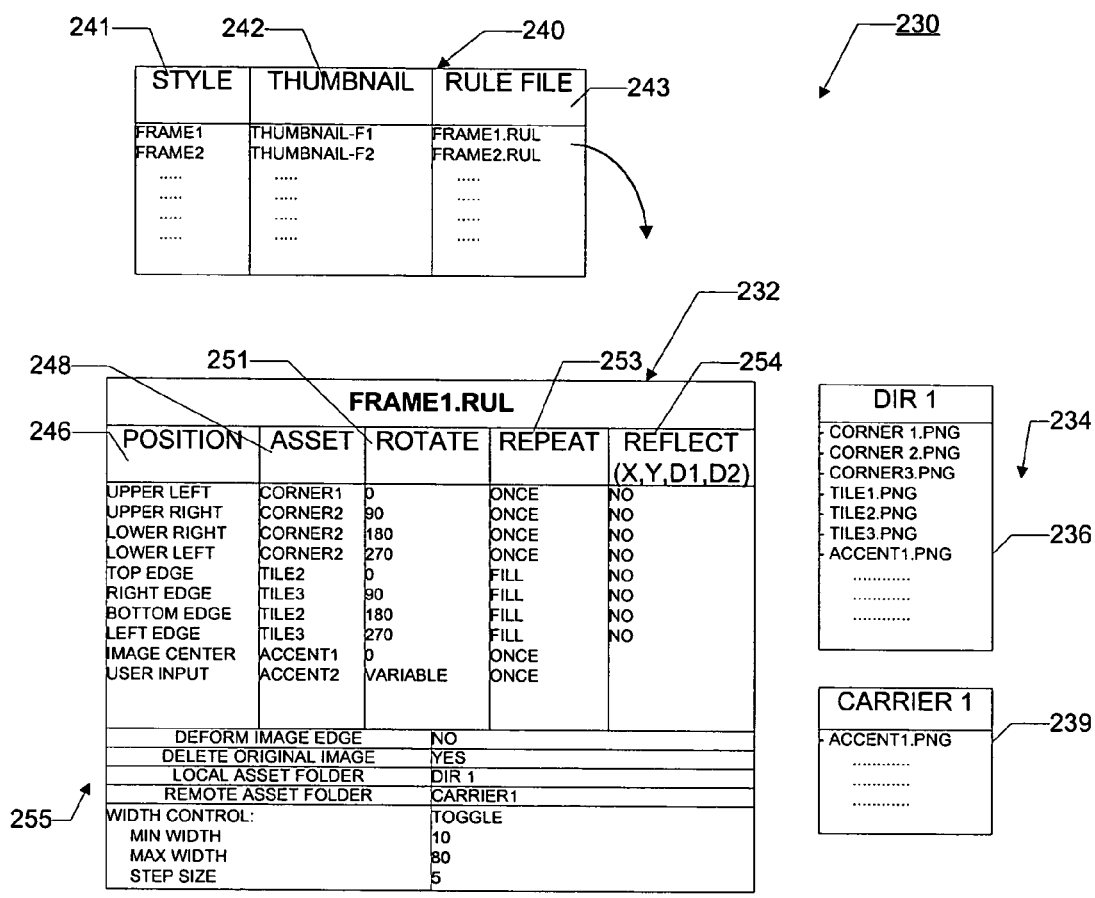
FIG. 5 is a block diagram of a frame description in accordance with the present invention.

Referring now to FIG. 5, a particular frame description 230 is illustrated. It will be appreciated that frame description 230 is for example only, and many alternatives, additions, and substitutions may be made consistent with this disclosure. Frame description 230 includes a set of rules 232 and a set of assets 234. The frame rule 232 is associated with a particular frame style. In FIG. 5, a style selection menu 240 is presented to facilitate selection of a particular frame style. The style selection 240 includes a list of style name 241, a graphical thumbnail of that frame 242, and an identification of the particular rule file 243 for that frame style. In the example illustrated in FIG. 5, the user selected a style "Frame1" and therefore may have seen a thumbnail on the display for that frame style. The "Frame1" style is associated with the specific frame rule of "frame1.rul". The "frame1.rul" frame rule is shown in FIG. 5 as frame rule 232. It will be appreciated that style selection 240 may include other information to facilitate selection by the user. It will also be understood that a style selection may be optional, where the selected frame style is a default frame style or a style selected by the image processor.

Rule file 232 may include information and instruction for positioning frame assets to build a frame. For example, the frame rule may include information regarding position 246, the specific asset to be used 248, a rotation of the asset 251, how many times to repeat the particular asset 243, and whether the asset is to be mirrored or reflected 254. The frame rule 232 also may include other control information 255 on how the frame is to be constructed, used, or transmitted, and may provide for variable user input. For example, frame rule 232 provides for input of a variable width using a toggle switch. The width is adjusted by a step size of 5 pixels each time the switch is toggled, with a minimum width of 5 pixels and a maximum width of 80 pixels. In this way a single frame description may be used for many frame sizes. The illustrated limits are for example only, and may be adjusted according to a desired resolution. It will be appreciated that some of the rule information may be ignored by a particular image processor depending upon the capability and characteristics of the image processor and local display device.

The example frame rule 232 shows that the upper left corner is based on an asset "corner1", while the upper right, lower right, and lower left corners are based upon the asset "corner2". Also, the top edge is based on the "tile2" asset while the other three edges are based on the "tile3" asset. Note that the corners are each positioned once, while the edges are filled between the corner segments. Frame rule 232 also includes an "accent1" asset, which is positioned in the middle of the image. The frame rule 232 also includes an "accent 2" asset which the user is allowed to interactively place. In this way, the user could take the graphic that is associated with "accent2" and using available user input controls, such as a toggle switch, position the graphic "accent2" at a specific location on the image. Frame rule 232 also includes other instructions 255 such as instructing the frame to be positioned around the image rather than deforming the edge of the image. Another instruction is so that after the framed image has been generated, the original unframed image is deleted.

The frame rule may also take advantage of symmetry in a frame style, and allow an asset or a frame portion to be mirrored or reflected 253 about an axis, such as the X axis, the Y axis, or a diagonal axis. The diagonal axis may extend from the upper left to the lower right of the image (D1) or from the lower left to the upper right of the image (D2). It will be appreciated that other lines of symmetry or mirroring may be defined for particular applications. Although FIG. 5 shows that individual assets may be reflected, it will be understood that a frame rule may be arranged to reflect or mirror larger frame portions.

The frame rule may also include information on where particular frame assets are stored. For example, some of the assets may be stored in a local directory such as "dir1", while other assets may be stored in a remote asset folder such as "carrier1". If the image processor is part of a wireless subscriber device, the identification of "carrier1" may be associated with a specific phone number wireless communication. By storing some of the assets on a remote server, the mobile phone is relieved from having to store the graphical assets locally. The graphical assets, which are stored in the asset file 234, are shown as either being stored locally 236 in "dir1" or stored remotely 239 in "carrier1". It will be appreciated that the style selection 240, the frame rule 232, and the asset files 234 may be alternatively arranged consistent with this disclosure.

Figure 6:
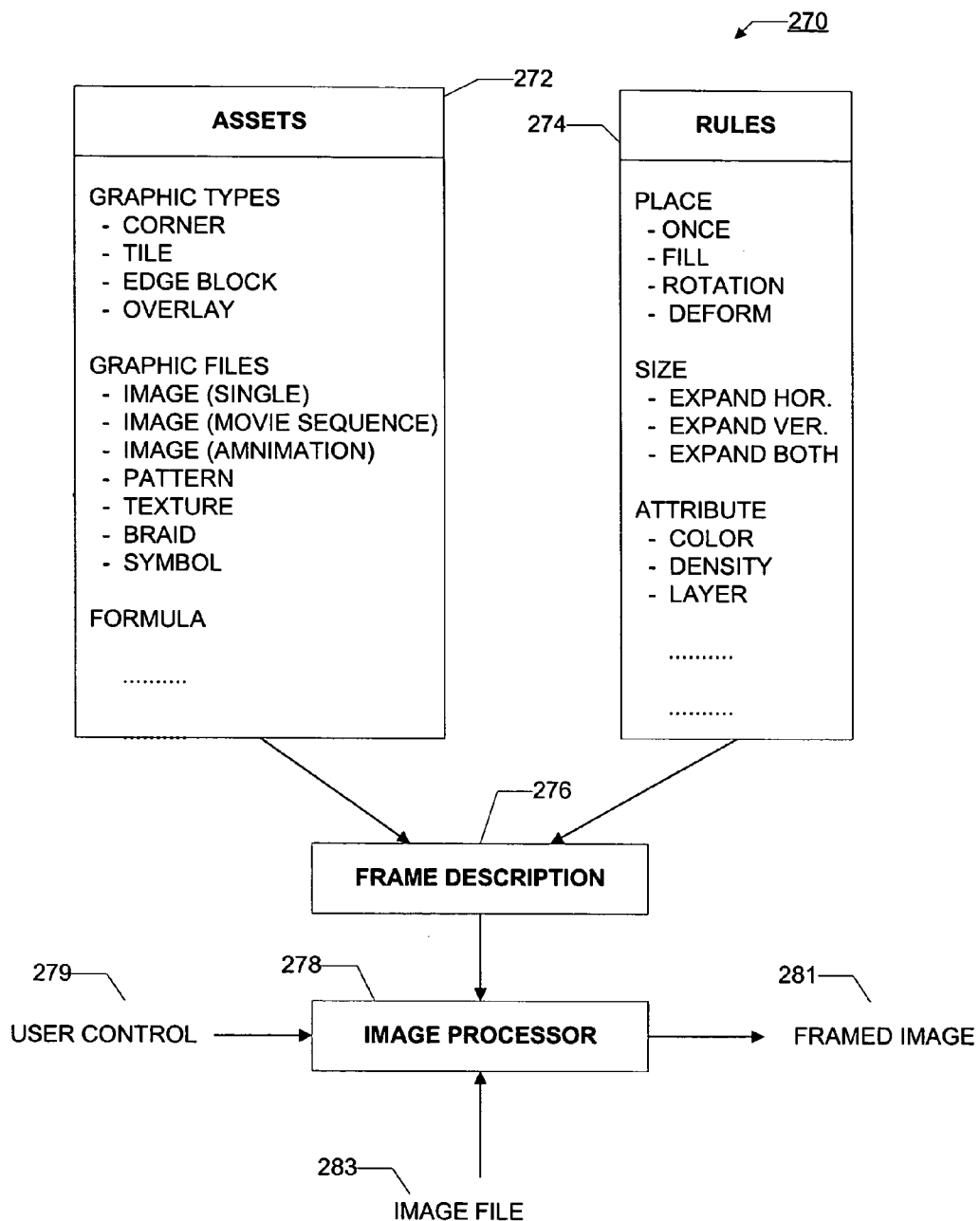
FIG. 6 is a block diagram of a system and method of framing in accordance with the present invention.

Referring now FIG. 6, a framing system 270 is shown. Framing system 270 includes assets 272 and rules 274 which cooperate to form frame descriptions 276. Assets may be of different types, such as corner assets, tile assets, edge assets, and overlay assets. An overlay asset may be for example, an asset that is positioned in the visible image portion of a framed image, thereby accenting a particular spot on a framed image. The assets may be stored in a graphic file in a standard or proprietary format, and may include images, animations, movies, pictures, patterns, textures, braids, or symbols, for example. In another example, an asset may be a mathematical formula for dynamically generating a framed portion. The rules 274 may include instructions on how to place a frame asset, such as placing it once, filling a space, and rotating the asset prior to generating a frame block. Also, the rule may instruct whether the frame blocks should deform the edge of an image, or should be placed around the image so as not to deform the edge. The rules may also provide instructions on sizing an asset. For example, an asset may be expanded horizontally, may be expanded vertically, or may be expanded on both axes. In this way, a leg of a corner piece could be extended to fill the space along an edge of an image. The rules may also specify attributes for the assets. For example, the attributes may include color, density, and identify a particular layer to place the frame block on. It will be appreciated that other asset characteristics and rule characteristics may be used consistent with this disclosure. The frame assets and frame rules may be stored together, or may be stored in different locations. It will also be understood that some of the assets and some of the rules may have default conditions that are applied unless a user makes alternative selections.

An image processor 278 uses the frame description to build or construct a frame, and the image processor combines the frame with an image file 283 to generate a framed image 281. User control 279 may be used to select a particular type of frame style to be applied, and may be used to adjust the characteristics of a particular frame description. For example, user control could be used to select a particular color or density for a frame asset, or may be used to particularly place an accent asset on an image. In this way user input is used to dynamically adjust characteristics of the final frame and final framed image. It will also be appreciated that the image processor may evaluate the image file and make dynamic choices as to how to apply particular frame assets. For example, if the image processor determines an image has a large area of a constant color, the image processor may dynamically decide to place an accent block in that area. It will be understood that the image processor may make these decisions with or without user input.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method of framing an image on a mobile wireless communication device comprising:
   providing an image processor on the mobile wireless communications, a memory readable by the image processor on the mobile wireless device, a frame description in the memory comprising a frame rule and at least one frame asset, the frame rule and a first frame asset usable by the image processor to generate a first portion of a frame usable to form a partial frame around an image, further requiring at least a second portion to be generated to make a complete frame, the image having a size and resolution, and where each frame portion is generated using a scalable dimension independent from the size and resolution of the image;
   retrieving a first frame asset associated with the frame description;
   generating a plurality of first frame blocks using the first frame asset, the first frame blocks being generated according to the frame rule; and
   placing the first frame blocks according to the frame rule, the first frame blocks positioned to form at least a portion of the frame for the image.

2. The method according to claim 1 further comprising:
   retrieving a second frame asset;
   generating a plurality of second frame blocks using the second frame asset, the second frame blocks being generated according to the frame rule; and
   placing the second frame blocks according to the frame rule, the first frame blocks and the second frame blocks positioned to form the frame for the image.

3. The method according to claim 1 further comprising:
   accepting user input from a control; and
   adjusting at least one of the first frame blocks responsive to the user input.

4. The method according to claim 3 wherein the user input specifies a width.

5. The method according to claim 1 wherein the frame extends continuously around the image.

6. The method according to claim 1 wherein at least some of the first frame blocks are positioned on the image.

7. The method according to claim 6 wherein the first frame blocks generated using the corner asset are positioned at at least one corner of the image.

8. The method according to claim 1 wherein at least some of the first frame blocks are positioned adjacent to the image.

9. The method according to claim 1 wherein the first frame asset is a corner asset, and generating the first frame blocks includes rotating the corner asset.

10. The method according to claim 1 wherein the first frame asset is a tile, and the first frame blocks generated using the tile are positioned to form a portion of the frame along an edge of the image.

11. The method according to claim 1 wherein the first frame asset is a graphics file.

12. The method according to claim 1 wherein the first frame asset is a formula.

13. A method of framing an image on a mobile wireless communication device comprising:
   providing an image processor on the mobile wireless communications, a memory readable by the image processor on the mobile wireless device, a frame description in the memory comprised of a frame rule and at least one frame asset, the frame rule and a first frame asset usable by the image processor to generate a first portion of a frame usable to form a partial frame around an image, further requiring at least a second portion to be generated to make a complete frame, the image having a size and resolution, and where each frame portion is generated using a scalable dimension independent from the size and resolution of the image;
   retrieving a corner asset associated with the frame description, the corner asset being indicative of a corner segment of a frame, the frame having a scalable dimension, the scalable dimension independent from the size and resolution of the image;
   generating four corner blocks using the corner asset, the corner blocks being generated by rotating the corner asset 0 degrees, 90 degrees, 180 degrees, and 270 degrees, respectively; and
   placing one of the corner blocks at each corner of the image.

14. The method according to claim 13, further comprising:
   retrieving an edge asset, the edge asset being indicative of an edge segment of the frame; and
   generating edge frame blocks using the edge asset, the edge frame blocks being sufficient to fill between two of the corner blocks along a side of the image.

15. The method according to claim 14, further comprising generating other edge frame blocks by rotating the edge asset, the other edge frame blocks being sufficient to fill between two of the corner blocks along another side of the image.

16. The method according to claim 13, further comprising: generating edge frame blocks using the corner asset, the edge frame blocks being sufficient to fill between two of the corner blocks along a side of the image.

17. A mobile wireless communication device comprising:
an image processor on the mobile wireless communications device;
a memory readable by the image processor on the mobile wireless device; and
a frame description in the memory comprising
at least one frame asset, the frame asset being a graphics file indicative of a segment of a frame, and,
a frame rule, the frame rule including instructions on processing the frame asset into a first frame block usable for framing an image by the image processor, the image having a size and a resolution, and placing the first frame block to form a portion of a frame, the first frame block having a scalable dimension, the scalable dimension independent from the size and resolution of the image, further requiring at least a second frame block to be generated by the image processor to make a complete frame, the second frame block also having a scalable dimension independent from the size and resolution of the image.

18. A mobile wireless communication device comprising:
an image processor on the mobile wireless communications device;
a memory readable by the image processor on the mobile wireless device;
a frame description in the memory comprising
a corner asset, the corner asset being a graphics file indicative of a corner segment of a frame, and,
an edge asset, the edge asset being a graphics file indicative of an edge segment of the frame, and,
a frame rule, the frame rule including instructions on processing by the image processor the corner asset and the edge asset into a plurality of frame blocks, and placing the frame blocks to form the frame, the frame blocks having a scalable dimension, the scalable dimension independent from the size and resolution of an image to be framed.

19. A method of publishing a framed image on a mobile wireless communication device comprising:
providing an image processor on the mobile wireless communications device, a memory readable by the image processor on the mobile wireless device, a frame description in the memory comprised of a frame rule and at least one frame asset, the frame rule and a first frame asset usable by the image processor to generate a first portion of a frame usable to form a partial frame around an image, further requiring at least a second portion to be generated to make a complete frame, the image having a size and resolution, and where each frame portion is generated using a scalable dimension independent from the size and resolution of the image;
selecting a frame style;
retrieving the frame rule and the one or more frame assets that are associated with the frame style;
generating frame blocks using the frame asset(s) in accordance with the frame rule;
placing the frame blocks in accordance with the frame rule to form a frame for the image, the frame having a scalable dimension, the scalable dimension independent from the size and resolution of the image;
generating the framed image using the frame and the image; and
publishing the framed image.

20. The method according to claim 19 wherein the acquiring step includes taking the image with a digital camera module.

21. The method according to claim 19 wherein the acquiring step includes downloading the image over a wireless network.

22. The method according to claim 19 wherein the selecting step includes previewing a thumbnail of the frame.

23. The method according to claim 19 wherein the frame rule includes instructions on rotating one of the assets to generate one of the frame blocks.

24. The method according to claim 19 wherein the frame rule accepts a user input in placing at least one of the frame blocks.

25. The method according to claim 19 wherein the frame rule accepts a user input in sizing at least one of the frame blocks.

26. The method according to claim 19 wherein the frame is placed adjacent to the image.

27. The method according to claim 19 wherein the frame is on the image, and deforms image pixels.

28. The method according to claim 19 wherein at least one of the frame assets is retrieved from a local memory.

29. The method according to claim 19 wherein at least one of the frame assets is retrieved from a remote server.

30. The method according to claim 19 wherein at least one of the frame assets is retrieved from a remote server using a wireless network.

31. The method according to claim 19 wherein the publishing step includes transmitting the framed image using a wireless network.

32. The method according to claim 19 wherein the placing step includes accepting user input from a user control.

33. The method according to claim 19 wherein the placing step includes using the image processor to analyze the image and placing at least one of the frame blocks responsive to the analysis.

34. The method according to claim 19 wherein the image is a picture.

35. The method according to claim 19 wherein the image is a sequence forming an animation.

36. The method according to claim 19 wherein the image is a is a sequence forming a movie.

* * * * *

UNITED STATES PATENT AND TRADEMARK OFFICE
CERTIFICATE OF CORRECTION

PATENT NO. : 7,184,061 B2  Page 1 of 1
APPLICATION NO. : 10/701196
DATED : February 27, 2006
INVENTOR(S) : Sumita Rao It is certified that error appears in the above-identified patent and that said Letters Patent is hereby corrected as shown below:

Column 12, line 17
Claim 7 should read:

-- 7.  The method according to claim 1 wherein at least some of the first frame blocks are positioned adjacent to the image. --

Column 12, line 20
Claim 8 should read:

-- 8.  The method according to claim 1 wherein the first frame asset is a corner asset, and generating the first frame blocks includes rotating the corner asset. --

Signed and Sealed this

Eleventh Day of September, 2007

JON W. DUDAS
*Director of the United States Patent and Trademark Office*